(12) United States Patent
Millhouse et al.

(10) Patent No.: US 10,628,786 B2
(45) Date of Patent: Apr. 21, 2020

(54) SYSTEM AND METHOD FOR GATE AND RESOURCE ASSIGNMENT AT A DISTRIBUTION CENTER

(71) Applicant: Walmart Apollo, LLC, Bentonville, AR (US)

(72) Inventors: Andrew B. Millhouse, Gilbert, AZ (US); Jeffrey Alan Ward, Casa Grande, AZ (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/186,949

(22) Filed: Nov. 12, 2018

(65) Prior Publication Data
US 2019/0164128 A1    May 30, 2019

Related U.S. Application Data

(60) Provisional application No. 62/592,082, filed on Nov. 29, 2017.

(51) Int. Cl.
*G06Q 10/08* (2012.01)
*H04L 29/08* (2006.01)
*G06Q 10/06* (2012.01)

(52) U.S. Cl.
CPC . *G06Q 10/08355* (2013.01); *G06Q 10/06312* (2013.01); *G06Q 10/087* (2013.01);
(Continued)

(58) Field of Classification Search
CPC ....... G06Q 10/08355; G06Q 10/06312; G06Q 10/0832; G06Q 10/0833; G06Q 10/087; H04L 67/12
(Continued)

(56) References Cited

U.S. PATENT DOCUMENTS 5,509,538 A    4/1996  Spindler
6,269,763 B1   8/2001  Woodland
(Continued)

FOREIGN PATENT DOCUMENTS

WO    WO-2014169375 A1 * 10/2014

OTHER PUBLICATIONS

Ajot. Karen Thuermer. "Transportation issues for perishable shippers". Published Oct. 20, 2014. https://www.ajot.com/premium/ajot-transportation-issues-for-perishables-shippers (Year: 2014).*

(Continued)

*Primary Examiner* — Shannon S Campbell
*Assistant Examiner* — Lisa Ma
(74) *Attorney, Agent, or Firm* — Fitch, Even, Tabin & Flannery LLP (57) ABSTRACT

An unloading gate at the destination is assigned and a first resources schedule for unloading personnel or automated vehicles to remove the products from the vehicle at the gate is determined by a control circuit based at least in part upon the anticipated future conditions of the product and resources information. A second resources schedule for quality control personnel or automated vehicles to inspect the products and to determine a quality control result based at least in part upon the anticipated future conditions of the product and the resources information. Based upon quality control results and the priority parameters, a product disposition schedule is determined by the control circuit.

14 Claims, 7 Drawing Sheets

(52) U.S. Cl.
CPC ..... *G06Q 10/0832* (2013.01); *G06Q 10/0833* (2013.01); *H04L 67/12* (2013.01)

(58) Field of Classification Search
USPC .......................................................... 705/332
See application file for complete search history.

(56) References Cited

U.S. PATENT DOCUMENTS

| | | |
|---|---|---|
| 7,110,855 B2 | 9/2006 | Leishman |
| 8,140,183 B2 | 3/2012 | Waddington |
| 8,626,548 B2 | 1/2014 | Patel |
| 8,639,543 B2 | 1/2014 | Boss |
| 2003/0167214 A1 | 9/2003 | Kang |
| 2003/0227392 A1* | 12/2003 | Ebert ..................... G06K 17/00 340/8.1 |
| 2004/0193466 A1 | 9/2004 | Kull |
| 2005/0131645 A1 | 6/2005 | Panopoulos |
| 2005/0165647 A1* | 7/2005 | Razumov ........... G06Q 10/0637 705/7.36 |
| 2007/0266081 A1* | 11/2007 | Murchison, III ....... G07F 17/12 709/203 |
| 2011/0035247 A1 | 2/2011 | Perry |
| 2011/0225023 A1* | 9/2011 | Evens .................. G06Q 10/087 705/7.31 |
| 2011/0231091 A1* | 9/2011 | Gourlay ........... G08G 1/096811 701/465 |
| 2014/0107971 A1 | 4/2014 | Engedal |
| 2014/0136255 A1 | 5/2014 | Grabovski |
| 2014/0344118 A1* | 11/2014 | Parpia .................. G06Q 10/087 705/28 |
| 2016/0019493 A1* | 1/2016 | Santavicca ....... G06Q 10/06311 705/7.15 |
| 2016/0042315 A1 | 2/2016 | Field-Darragh |
| 2016/0320773 A1 | 11/2016 | Skaaksrud |
| 2018/0293527 A1* | 10/2018 | Amirjalayer ..... G06Q 10/06311 |
| 2019/0062055 A1* | 2/2019 | Hance ................... B65G 1/137 |
| 2019/0266567 A1* | 8/2019 | Borucki ........... G06Q 10/08355 |

OTHER PUBLICATIONS

PCT; App. No. PCT/US2018/062574; International Search Report and Written Opinion dated Jan. 24, 2019.

* cited by examiner

SCHEDULE FOR MONDAY

| JOHN | GATE A | 9:00 – 11:00 |
|------|--------|---------------|
| JOHN | GATE A | 11:00 – 12:00 |
| MARY | GATE B | 9:00 – 10:30 |

SYSTEM AND METHOD FOR GATE AND RESOURCE ASSIGNMENT AT A DISTRIBUTION CENTER

CROSS-REFERENCE TO RELATED APPLICATION

This application claims the benefit of the following U.S. Provisional Application No. 62/592,082 filed Nov. 29, 2017, which is incorporated herein by reference in its entirety.

TECHNICAL FIELD

These teachings relate to resource allocation at a distribution center and, more specifically, to gate assignment and scheduling at distribution centers or similar locations.

BACKGROUND

Distribution centers, warehouses, and retail stores receive retail products for eventual customer purchase. The products typically arrive by delivery trucks from the manufacturer or from other distribution centers. In order to move the products into the retail store, the products must be first unloaded from the delivery trucks at an unloading dock, and eventually moved into the store.

The products being unloaded may have different preservation requirements (e.g., a requirement to be kept frozen). Other products may be high-priority products that are selling quickly (and produce a greater profit margin) compared to other products.

Unfortunately, it is often unpredictable when products will actually be unloaded from delivery vehicles and moved into the stores. For example, a truck may be scheduled to arrive during a certain time period, but arrive late, thereby affecting the unloading of other trucks. Due to unforeseen circumstances, products may sit on the dock and spoil while other trucks arrive and are unloaded.

BRIEF DESCRIPTION OF THE DRAWINGS

The above needs are at least partially met through the provision of approaches that obtain schedules, particularly when studied in conjunction with the drawings, wherein.

DETAILED DESCRIPTION

Generally speaking, systems and methods are provided that automatically assign loading facilities and determine schedules (or the controlling or activating automated vehicles to perform tasks) to efficiently and effective load unload merchandise at a distribution center, warehouse, or retail store. In aspects, the estimated time of arrival of the truck, the priority of the product (as defined, for example, by the cost and demand of the products), and the availability of workers can be used to assign a loading dock and to schedule various tasks (e.g., unloading, quality control, or moving) of the products.

In many of these embodiments, a system is configured to automatically manage the unloading of vehicles at an unloading dock at a shipment destination. The system includes a product tracking service, a transceiver, a database, and a control circuit.

The product tracking service is configured to sense an electronic identifier on or at the products (or vehicle) that are being shipped on or in a vehicle from a shipping source to a shipping destination. The product tracking service is further configured to determine an estimated time of arrival (ETA) of the vehicle at the shipping destination based upon a current sensed location of the products and traffic conditions associate with the vehicle.

The transceiver is configured to receive the ETA from the product tracking service. The transceiver is also configured to receive priority parameters associated with the products.

The database is coupled to the transceiver. The database is configured to store resources information concerning workers or automated vehicle at the destination, the ETA, and the priority parameters.

The control circuit is coupled to the transceiver and the database, and is configured to determine anticipated future conditions of the product based upon the ETA and the priority parameters. The control circuit is further configured to assign an unloading gate at the destination and determine a first resources schedule for unloading personnel or automated vehicle to remove the products from the vehicle at the gate based at least in part upon the anticipated future conditions of the product and the resources information. The control circuit is additionally configured to determine a second resources schedule for quality control personnel or automated vehicle to inspect the products and to determine a quality control result based at least in part upon the anticipated future conditions of the product and the resources information. Based upon quality control results and the priority parameters, the control circuit is configured to determine a product disposition schedule.

In aspects, the anticipated future product conditions relate to future spoilage or inoperability of the product. In other examples, the priority parameters include an identity of the product, a cost of the product, an air temperature, conditions on dock, store demand for product, a next vehicle to be unloaded, or cold chain requirements for the product. Other examples are possible.

In other examples, the shipping destination is a distribution center or warehouse. In other aspects, the control circuit is configured to obtain an access code and to send the access code to a driver of the vehicle.

In still other examples, the product disposition schedule specifies a third resources schedule to move the products from the destination to a selected area in a retail store. In aspects, the selected area is a freezer, a chiller, a stockroom, or a retail space. Other examples are possible.

In yet other aspects, the control circuit is configured to a third resources schedule to move the products from the destination to return vehicles to return unacceptable products to the shipping source.

In still other examples, the traffic conditions include weather conditions and traffic congestion conditions. Other examples are possible.

In yet other aspects, the priority parameters are received from the vehicle, from the shipping source, or from the manufacturer of the product. The priority parameters may be received from other sources as well.

In others of these embodiments, an electronic identifier is sensed on products that are being shipped on a vehicle from a shipping source to a shipping destination, and an estimated time of arrival (ETA) of the vehicle is determined at the shipping destination based upon a current sensed location of the products and traffic conditions associate with the vehicle.

The ETA and priority parameters associated with the products are received, and resources information concerning workers at the destination, the ETA, and the priority parameters are stored at a database. Anticipated future conditions of the product are determined based upon the ETA and the priority parameters at a control circuit.

An unloading gate at the destination is assigned and a first resources schedule for unloading personnel or automated vehicles to remove the products from the vehicle at the gate are determined by the control circuit based at least in part upon the anticipated future conditions of the product and the resources information.

The control circuit determines a second resources schedule for quality control personnel or automated vehicles to inspect the products and to determine a quality control result based at least in part upon the anticipated future conditions of the product and the resources information. Based upon quality control results and the priority parameters, a product disposition schedule is determined by the control circuit.

In still others of these embodiments, a system is configured to automatically manage the unloading of vehicles at an unloading dock at a shipment destination. The system includes a shipping vehicle and products that are being shipped aboard the shipping vehicle from a shipping source to a shipping destination.

The system includes an electronic identifier that is coupled to or associated with the products. The electronic identifier is configured to provide information sufficient to identify the products.

The system further includes one or more automated vehicles operating at the shipping destination, and a product tracking service including one or more first sensors. The first sensors are configured to sense the electronic identifier coupled to or associated with the products that are being shipped on the vehicle from the shipping source to the shipping destination.

The system includes one or more second sensors. The second sensors are arranged to sense traffic conditions along the route of the vehicle from the shipping source to the shipping destination.

The product tracking service is configured to determine an estimated time of arrival (ETA) of the vehicle at the shipping destination based upon a current sensed location of the products and the traffic conditions associated with the vehicle.

The system additionally includes a transceiver that is configured to receive the ETA from the product tracking service. The transceiver is also configured to receive priority parameters associated with the products. The system includes a database that is coupled to the transceiver. The database is configured to store resources information concerning workers or automated vehicles at the destination, the ETA, and the priority parameters.

The system further includes a control circuit that is coupled to the transceiver and the database. The control circuit being configured to: determine anticipated future conditions of the product based upon the ETA and the priority parameters; assign an unloading gate at the destination and determine a first resources schedule for the automated vehicles to remove the products from the vehicle at the gate based at least in part upon the anticipated future conditions of the product and the resources information; determine a second resources schedule for the automated vehicles to inspect the products and to determine a quality control result based at least in part upon the anticipated future conditions of the product and the resources information; based upon quality control results and the priority parameters, and determine a product disposition schedule. The automated vehicles are utilized to implement the first resources schedule, the second resources schedule, and the product disposition schedule.

Figure 1:
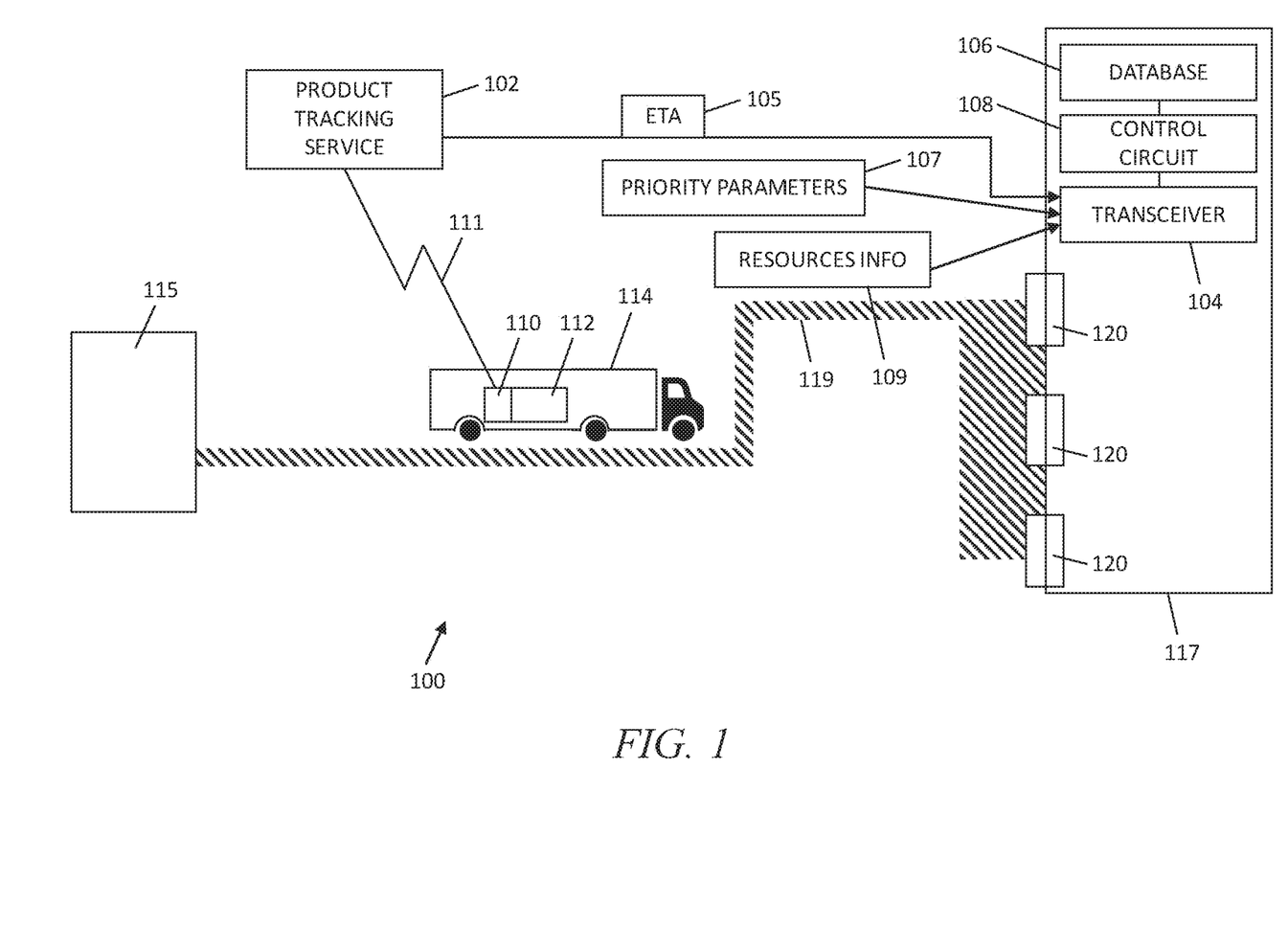
FIG. 1 comprises a diagram of a system as configured in accordance with various embodiments of these teachings.

Referring now to FIG. 1, a system 100 that is configured to automatically manage the unloading of vehicles at an unloading dock at a shipment destination (e.g., a distribution center, retail store, or warehouse) is described. The system 100 includes a product tracking service 102, a transceiver 104, a database 106, and a control circuit 108. The transceiver 104, database 106, and control circuit 108 are shown as being disposed at a shipping destination 117. However, it will be appreciated that these elements may be located at other locations such as a central location or home office.

The product tracking service 102 is configured to sense an electronic identifier 110 on or at products 112 that are being shipped on a vehicle 114 from a shipping source 115 to a shipping destination 117. The identifier may also be at the vehicle 114 and not attached to the products. The identifier 110 may be, for example, an RFID tag, GPS trailer seal, or similar device. The product tracking service 102 is configured to determine an estimated time of arrival (ETA) 105 of the vehicle at the shipping destination based upon a current sensed location of the products and traffic conditions associate with the vehicle 114. For example, an electronic signal 111 may be sent from transmitters (e.g., located at base stations) and the tags respond to this signal. The response may itself be a signal that indicates a location, or the response may be used to determine a location. In examples, the traffic conditions include weather conditions and traffic congestion conditions. Other examples of traffic conditions are possible.

Once the location is known, the tracking service 102 may compare this to a route 119 to be taken by the vehicle 114 from the shipping source 115 to the shipping destination 117. The route 119 may be received by the product tracking service 102 from another source (e.g., from the shipper or the driver of the vehicle 114), or may in some cases be determined by the product tracking service 102 (or some other third-party service). The route is information that specifies the pathway the vehicle will take to reach the destination 117). The product tracking service 102 may be implemented as any combination of computer hardware and software. For example, the product tracking service 102 may include transmitters and receivers, and may be further implemented using computer instructions executed at a control circuit.

The transceiver 104 is implanted as any combination of electronic hardware or software and is configured to receive the ETA 105 from the product tracking service 102. The transceiver 104 is also configured to receive priority parameters 107 associated with the products 112. In examples, the priority parameters 107 include an identity of the product, a cost of the product, an air temperature, conditions on dock, store demand for product, a next vehicle to be unloaded, or cold chain requirements for the product. Other examples of priority parameters are possible. The priority parameters 107 may be received from various sources such as from the manufacturer, the vehicle 114, the shipping source 113, other third parties, or combination of sources.

The database 106 is any type of memory storage device and is coupled to the transceiver 104. The database 106 is configured to store resources information 109 concerning workers or automated vehicles at the destination, the ETA 105, and the priority parameters 107.

The control circuit 108 is coupled to the transceiver 104 and the database 106, and is configured to determine anticipated future conditions of the product based upon the ETA 105 and the priority parameters 107. In aspects, the anticipated future product conditions relate to future spoilage or inoperability of the product. In one example, the time needed to spoil may be determined by considering the temperature maintained at the vehicle, the type of product, and a known relationship (e.g., an equation) that can be used to determine how long a product can be preserved. Other examples are possible.

The control circuit 108 is further configured to assign an unloading gate 120 at the destination and determine a first resources schedule for unloading personnel or automated vehicles to remove the products from the vehicle at the gate 120 based at least in part upon the anticipated future conditions of the product and the resources information. The first resources schedule may be communicated to the personal or automated vehicle involved in a variety of ways such as electronically (e.g., electronic instructions that instruct or control an automated vehicle). The schedule may include instructions or indications of a time that the personnel or automated vehicle is activated, the location (e.g., gate) where the personnel or automated vehicle is needed, and other requirements or responsibilities.

In one example, the future conditions may indicate an imminent spoilage of products 112 so the next available gate 120 and/or the gate 120 nearest to refrigeration unit should be assigned. It will be appreciated that the control circuit 108 may prioritize certain shipments over other shipments. For instance, trucks with high priority items (e.g., perishable items or items in high demand) may be prioritized over other items. The control circuit 108 may also consider the amount of particular items in a vehicle and their relative importance when making gate (or schedule) assignments. For example, some trucks may be moving a greater number of high priority items than other trucks, and the trucks with the greatest number of high priority items may be assigned the best gate positions and be assigned the best personnel or automated vehicles for unloading and other activities.

The schedule may be determined based upon, for example, the current availability of humans and/or automated vehicles. In some cases, humans and/or automated vehicles may be re-assigned from tasks they are currently executing based upon the urgency to unload a particular cargo from the truck 114. The schedule or instruction (and any of the schedules described herein) may be sent to the humans and automated vehicles in any appropriate manner, such as electronically (e.g., sent to a human on a portable electronic device carried by the human, or as electronic control signals that cause an automated vehicle to move from one location to another location).

The control circuit 108 is additionally configured to determine a second resources schedule for quality control personnel or automated vehicles to inspect the products and to determine a quality control result based at least in part upon the anticipated future conditions of the product and the resources information. The second resources schedule may be communicated to the personal or automated vehicle involved in a variety of ways such as electronically (e.g., electronic instructions that may activate or control an automated vehicle). The schedule may include instructions or indications of a time that the personnel or automated vehicle is activated, the location (e.g., gate) where the personnel or automated vehicle is needed, and other requirements or responsibilities.

In examples, the schedule may be determined based upon which personnel or automated vehicles are available, whether the humans or automated vehicles (e.g., automated vehicles) are near a particular gate, or whether the humans or automated vehicles are qualified to remove certain types of products. The number of humans and automated vehicles can also be adjusted based upon these or other factors. For instance, a worker or automated vehicle that is qualified (e.g., physically or mechanically capable) to remove certain products, is near the unloading gate, and is available may be selected. In another example, an automated vehicle can move products from gates, through a warehouse to different areas of a retail store. In still other examples, the automated vehicles may arrange display areas in the store or arrange or re-arrange shelving to position products. In aspects, the location of the automated vehicle may be tracked, for example, with sensors and a tracking service.

Based upon quality control results and the priority parameters 107, the control circuit 108 is configured to determine a product disposition schedule. For example, the control circuit 108 may determine whether to move the product into the store if the quality control results are positive or acceptable, or return the product to the truck if the quality control results are not acceptable. The product disposition schedule may include instructions or indications of a time that the personnel or automated vehicle is activated, the location (e.g., gate) where the personnel or automated vehicle is needed, and other requirements or responsibilities.

In still other examples, the product disposition schedule specifies a third resources schedule to move the products from the destination to a selected area in a retail store. In aspects, the selected area is a freezer, a chiller, a stockroom, or a retail space. Other examples are possible.

In other aspects, the control circuit 108 is configured to obtain an access code and to send the access code to a driver of the vehicle. The driver may enter the code into a portable electronic device and allow the driver to, for example, see schedules or report information.

In yet other aspects, the control circuit 108 is configured to a third resources schedule to move the products from the destination to return vehicles to return unacceptable products to the shipping source. The schedule may include instructions or indications of a time that the personnel or automated vehicle is activated, the location (e.g., gate) where the personnel or automated vehicle is needed, and other requirements or responsibilities.

Figure 2:
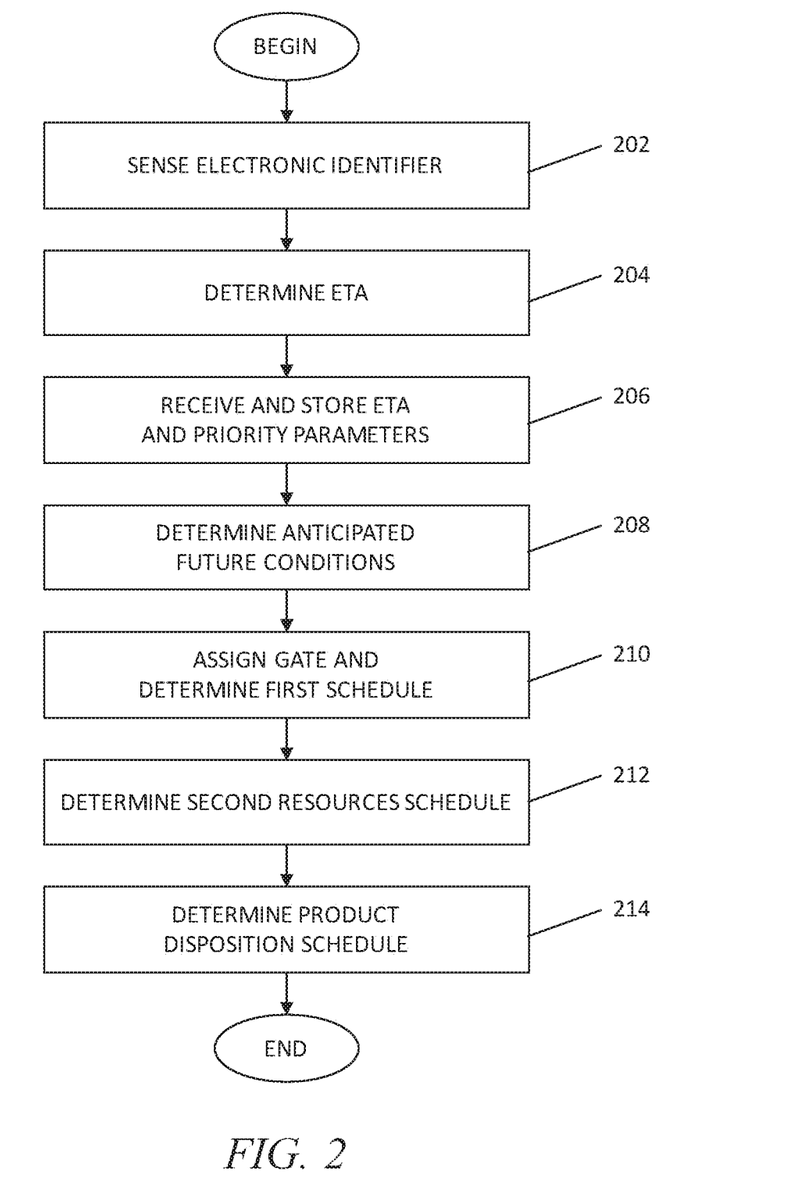
FIG. 2 comprises a flowchart as configured in accordance with various embodiments of these teachings.

Referring now to FIG. 2, one example of an approach for scheduling a gate or other location for product delivery is described. At step 202, an electronic identifier is sensed on products that are being shipped on a vehicle from a shipping source to a shipping destination. The product identifier may also be an electronic sealing device present at the vehicle. The sensing may be accomplished using a product tracking service, which automatically tracks the identifier. Various types of sensors may be used.

At step 204, an estimated time of arrival (ETA) of the vehicle at the shipping destination is determined based upon a current sensed location of the products and traffic conditions associate with the vehicle. For example, the tracking service may monitor the weather and traffic conditions along the route taken by the vehicle. Knowing the route the truck is scheduled to take allows the tracking service to compute or determine an ETA. This time changes over time, and may be re-calculated at periodic intervals as, for example, traffic or weather conditions change.

At step 206, the ETA and priority parameters associated with the products are received at a distribution center or other location, and resources information concerning workers at the destination, the ETA, and the priority parameters are stored at a database. Priority parameters may include an identity of the product, a cost of the product, an air temperature, conditions on dock, store demand for product, a next vehicle to be unloaded, or cold chain requirements for the product. Resources information concerning workers or automated vehicles may include workers or automated vehicles available, how long they are available, how far workers or automated vehicles are from particular gates or unloading areas, the type of products, the jobs particular workers or automated vehicles are capable of performing, and scheduled work or automated vehicle downtimes.

At step 208, anticipated future conditions of the product are determined based upon the ETA and the priority parameters at a control circuit. Future product conditions may relate to future spoilage or inoperability of the product. In examples, the time needed to spoil may be determined by the temperature maintained at the vehicle and the type of product. Other examples are possible.

At step 210, an unloading gate at the destination is assigned and a first resources schedule for unloading personnel or automated vehicles to remove the products from the vehicle at the gate is determined by the control circuit based at least in part upon the anticipated future conditions of the product and the resources information. For example, if a product is going to quickly spoil, the next available gate may be assigned or the gate closest to a refrigeration unit (to store the product) may be selected. If the product is non-perishable, then any gate may be selected while gates for perishable products may be reserved for future use.

The first resources schedule may be communicated to the personal or automated vehicle involved in a variety of ways such as electronically (e.g., electronic instructions). The schedule may include instructions or indications of a time that the personnel or automated vehicle is activated, the location (e.g., gate) where the personnel or automated vehicle is needed, and other requirements or responsibilities.

At step 212, the control circuit determines a second resources schedule for quality control personnel or automated vehicles to inspect the products and to determine a quality control result based at least in part upon the anticipated future conditions of the product and the resources information. The quality control result, in aspects, may be that the product is acceptable or not acceptable for sale to the public. For instance, various standards (e.g., freshness or condition standards) may be applied against the product.

In another example, if the product is going to spoil quickly, then a schedule is made to deploy workers and/or automated vehicles immediately to the selected gate. Workers or automated vehicles may be selected based upon their experience with urgent unloadings and/or whether they are capable (e.g., can lift) certain products.

The second resources schedule may be communicated to the personal or automated vehicle involved in a variety of ways such as electronically (e.g., electronic instructions). The schedule may include instructions or indications of a time that the personnel or automated vehicle is activated, the location (e.g., gate) where the personnel or automated vehicle is needed, and other requirements or responsibilities.

At step 214, and based upon quality control results and the priority parameters, a product disposition schedule is determined by the control circuit. For example, the control circuit may determine whether to move the product into the store if the quality control results are positive or acceptable, or return the product to the truck if the quality control results are not acceptable.

The product disposition schedule may be communicated to the personal or automated vehicle involved in a variety of ways such as electronically (e.g., electronic instructions). The schedule may include instructions or indications of a time that the personnel or automated vehicle is activated, the location (e.g., gate) where the personnel or automated vehicle is needed, and other requirements or responsibilities.

Referring now to FIGS. 3A, 3B, 3C, and 3D, one approach for automatic gate assignment and work schedule assignment is described. It will be appreciated that this is one example of an assignment approach and that other examples are possible. In this example, a truck, trailer, or vehicle is delivering products to a distribution center. One or more RFID tags and/or GPS trailer seals (e.g., electronic devices known in the art used to seal and track the trailer) are deployed at the trailer.

Figure 3A:
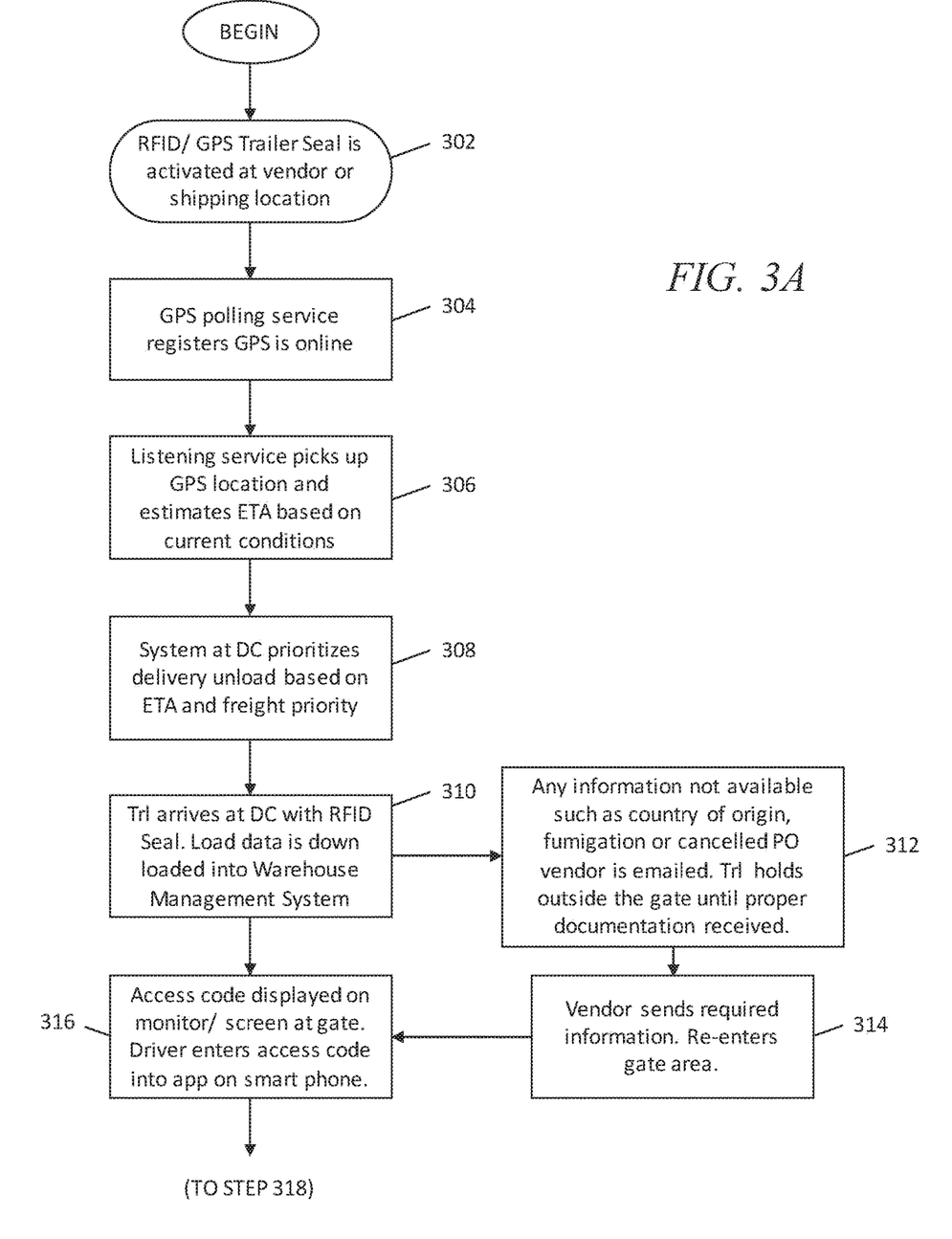
FIGS. 3A, 3B, 3C, and 3D comprise flowcharts as configured in accordance with various embodiments of these teachings.

At step 302, the RFID tag and/or GPS trailer seal are activated at a vendor at the shipping location. The activation may be accomplished by transmitting a wireless signal to the device.

At step 304 the GPS polling service (or other similar activation or registration service) registers the RFID and/or GPS trailer seal (e.g., on-line via an interne connection). At step 306, a tracking (or listening) service picks up the location of the GPS device or tag and determines an estimated arrival time (ETA) based upon the current conditions involving the truck (e.g., the traffic or weather conditions to mention two examples).

At step 308, the system at the distribution center prioritizes the delivery based upon the estimated arrival time and the priority of the cargo (freight). For example, the estimated time of arrivals for various trucks may be ranked from soonest (in time) to latest (in time).

At step 310, the trailer arrives at the distribution center with the RFID tag and/or GPS trailer seal. The data concerning the cargo (load data) is downloaded into the warehouse management system. The data may include information concerning the products on the truck.

Two possible paths may now be taken. The first path is the execution of steps 312 and 314 (not all proper documentation is available for the truck or shipment), and the second path is the execution of step 316 (proper documentation is available for the truck or shipment).

If no proper documentation exists, at step 312, any information not available (e.g., country of origin, fumigation, or cancelled purchase order (PO) vendor) can be emailed to the distribution center. The truck holds outside the gate until the proper documentation is received. At step 314, the proper documentation is sent (e.g., via email). Execution continues with step 316 as described below.

At step 316, an access code is displayed on a monitor screen at the gate. The driver of the trailer enters the code into a device (e.g., a smartphone) allowing the driver to send and/or receive information from the distribution center.

Upon completion of step 316, step 318 is executed. Step 318 selects an optimum open door (or gate) based upon the commodity and temperature, level of service (LOS), prime and reserve locations, congestion at the various gates, and store demand for the product.

Figure 3B:
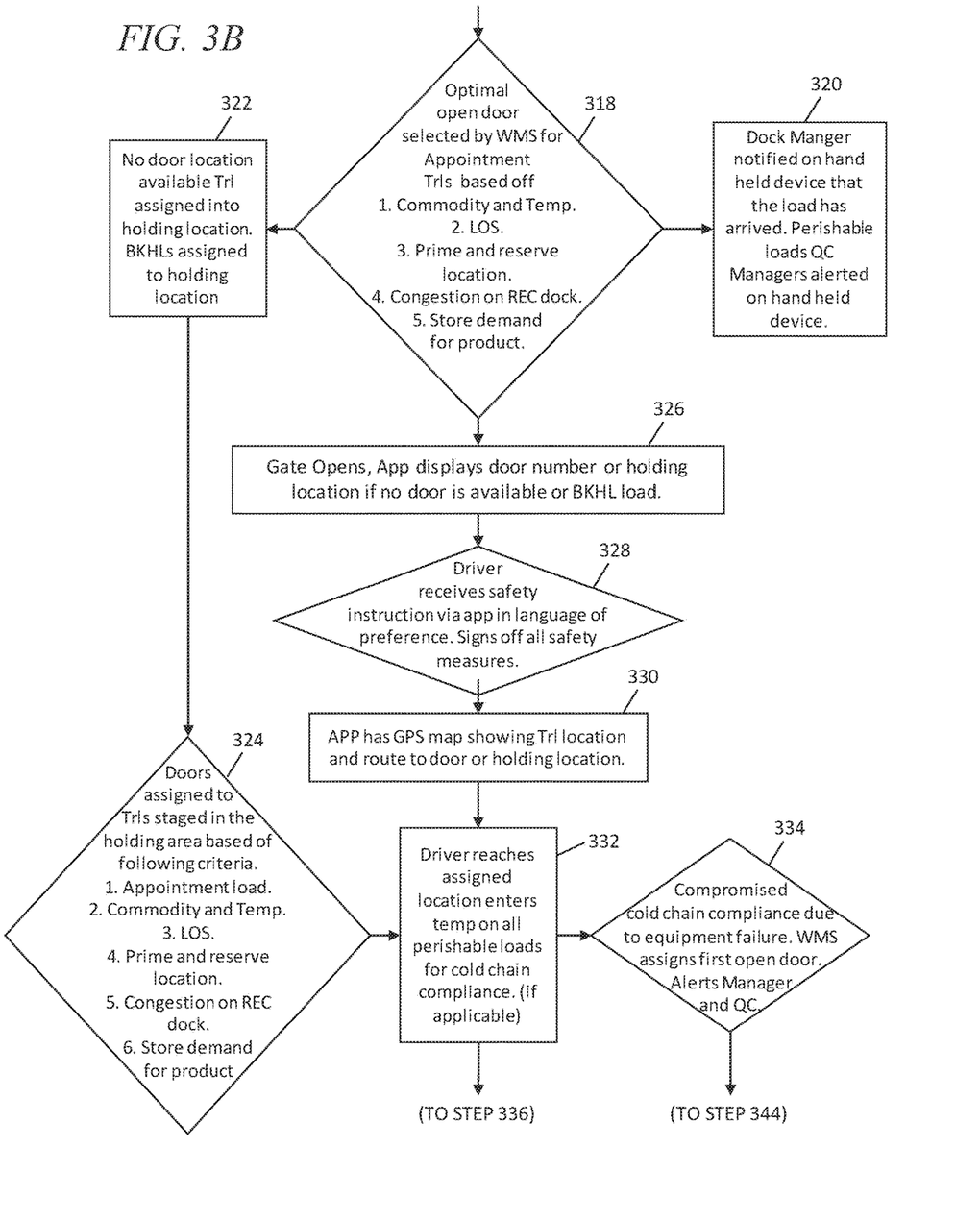

At step 320, a dock manager may be notified that the truck has arrived. Special alerts may be made for perishable loads.

At step 322, it is determined that no location (e.g., gate, door or dock) is available. A holding location is then selected. At step 324, a door or gate is assigned in a holding area based upon appointment load at the door or gate, the commodity and the temperature, LOS, the prime and reserve gate location, congestion at the dock, and store demand for the product. Step 332 is executed next (as described below).

Steps 326, 328, and 330 are executed when a gate is available. At step 326, the gate is open. An application may be executed on an electronic device used by the driver (or others) may display the door number. At step 328, the driver receives any safety instructions. At step 330, an application being used by the driver on an electronic device has a map that shows the trailer and its location. As mentioned, this map is displayed to the driver, for example, on an electronic device.

At step 332 (whether a holding or non-holding location), the driver reaches the assigned location (e.g., gate) and enters the temperature on all perishable loads for cold chain compliance. Execution continues at step 336.

At step 334, cold chain compliance has been compromised. This may be detected automatically or manually. Execution continues at step 344.

At step 336, if the assigned location is a door (or gate), the driver will enter into the application that the trailer is unhooked and chalked. At step 338, the system alerts the dock manager that the cargo or load is ready to be unloaded.

Figure 3C:
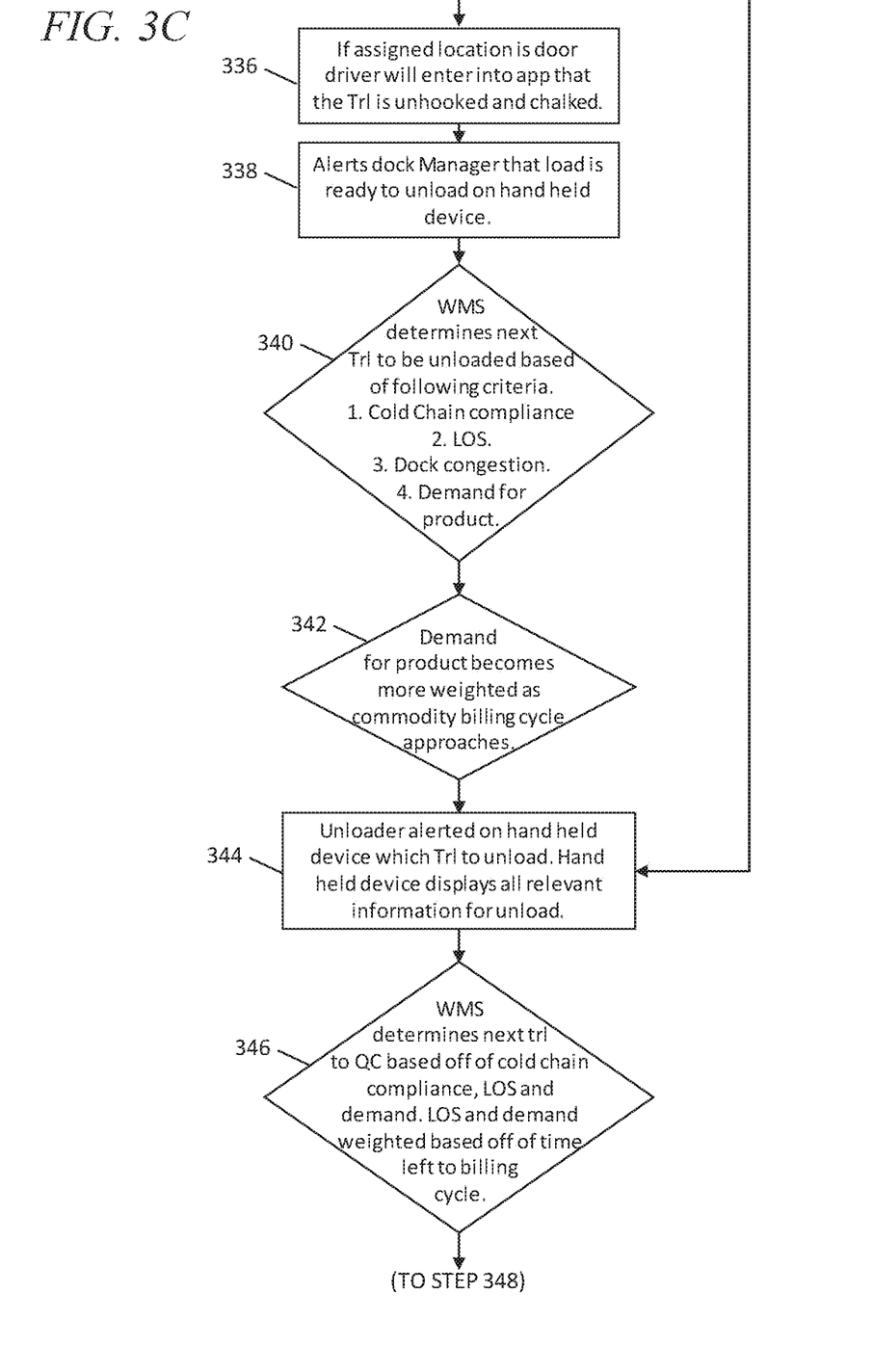

At step 340, the next trailer to be unloaded is determined based upon cold chain requirements, the level of service dock congestion, and demand for the product. At step 342, the demand for the product becomes more weighted as the commodity billing cycle approaches.

At step 344, the unloader is alerted on, for example, a hand-held device the trailer to unload. The hand-held device displays all the relevant information for the unload.

At step 346, the system determines the next trailer to undergo quality control based upon the cold chain compliance, level of service, and demand. The level of service and demand may be weighted based upon time left on billing cycle.

At step 348, product is evaluated and scored on a quality control hand-held device. The product may be accepted or rejected by the worker or automated vehicle that is performing the quality control check.

Figure 3D:
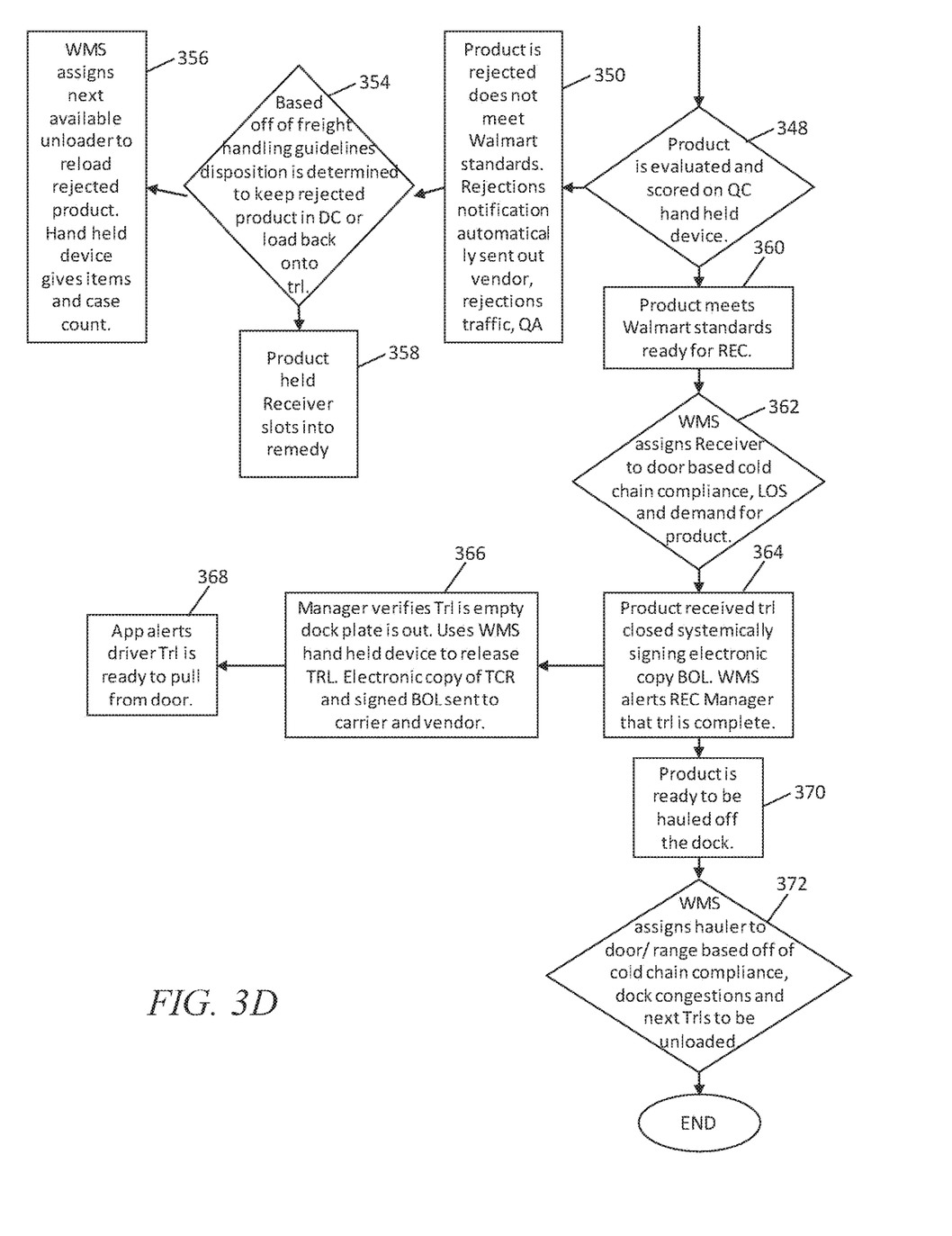

If the product is rejected due to predetermined standards, at step 350, a rejection notification may be sent to the vendor of the product. At step 354, based upon freight handling guidelines, it is determined whether to keep the rejected product in the discount center, or to send the rejected product back to the vendor (e.g., in the same or different trailer). At step 356 and if the product is to be returned, the distribution center assigns the next available unloader to re-load the rejected product on the trailer. A hand-held device may display the item and the case count. At step 358, and if the product is not to be returned, the product may be held.

If the product is accepted, the product is ready to be received at step 360. At step 362, the system assigns a receiver to the door based upon cold chain compliance, level of service, and demand for the product.

At step 364, the product is received from the trailer. An electronic bill of lading may be signed. The system alerts the receiving manager that the unload is complete. At step 366, the manager verifies that the trailer is empty. The trailer is released. The electronic copy of the bill of lading is sent to the carrier and the vendor. At step 368, the application alerts the driver that the trailer is ready to leave the dock.

At step 370, the product is ready to be hauled off the dock. At step 372, the distribution center assigns a hauler to the door or range based upon the cold chain compliance, the dock congestion and the next trailer to be unloaded.

Figure 4:
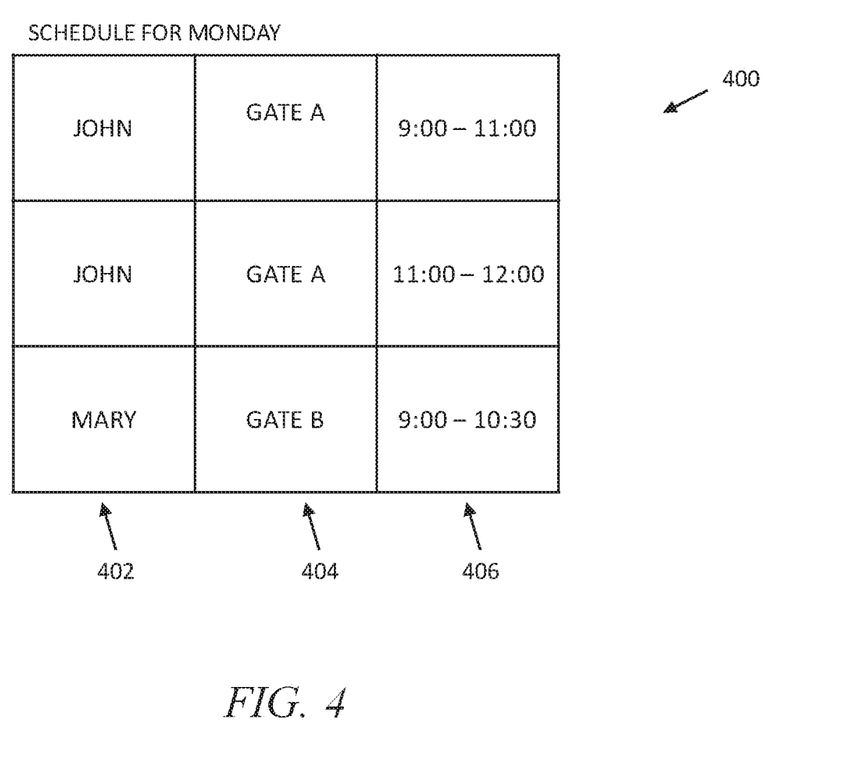
FIG. 4 comprises a block diagram as configured in accordance with various embodiments of these teachings.

Referring now to FIG. 4, one example of a work schedule 400 is described. The schedule 400 can be any of the schedules described elsewhere herein. The schedule 400 may be emailed to all workers, or just to some workers. In other examples, the schedule is maintained in a database (e.g., at a distribution center, retail store, or some central location), and workers 402 on the schedule 404 are electronically informed (e.g., via email) of the locations 404 and times 406 of where they need to be for particular tasks.

It will be appreciated that if automated vehicles are used, control signals can be sent to the automated vehicles that cause the automated vehicles to report to a particular location at a particular time. Automated vehicles may be unmanned ground vehicles or aerial drones to mention two examples. Other examples of automated vehicles are possible.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system configured to automatically manage the unloading of vehicles at an unloading dock at a shipment destination, the system comprising:
   a shipping vehicle;
   products that are being shipped aboard the shipping vehicle from a shipping source to a shipping destination;
   an electronic identifier coupled to or associated with the products, the electronic identifier configured to provide information sufficient to identify the products;
   one or more automated vehicles operating at the shipping destination;
   a product tracking service including one or more first sensors, the first sensors being configured to sense the electronic identifier coupled to or associated with the products that are being shipped on the vehicle from the shipping source to the shipping destination;
   one or more second sensors, the second sensors being arranged to sense traffic conditions along the route of the vehicle from the shipping source to the shipping destination;
   wherein the product tracking service is configured to determine an estimated time of arrival (ETA) of the vehicle at the shipping destination based upon a current sensed location of the products and the traffic conditions associated with the vehicle;
   a transceiver that is configured to receive the ETA from the product tracking service, the transceiver also being configured to receive priority parameters associated with the products wherein the priority parameters indicate the demand for the products and whether the products are perishable;
   a database that is coupled to the transceiver, the database configured to store resources information concerning workers or automated vehicles at the destination, the ETA, and the priority parameters;
   a control circuit that is coupled to the transceiver and the database, the control circuit being configured to:
   determine anticipated future conditions of the products based upon the ETA and the priority parameters, wherein the anticipated future conditions of the products relate to future spoilage or inoperability of the products;

determine a priority of the products;

initially, assign an unloading gate at the destination and determine a first resources schedule for the automated vehicles to remove the products from the vehicle at the gate based at least in part upon the anticipated future conditions of the product, the priority, and the resources information, and when there is no unloading gate available, assign the vehicle to a waiting area;

wherein the products have a first priority when the products are perishable and in demand, and have a second priority when the products are non-perishable and not in demand, and the first priority is higher than the second priority;

wherein when the products have a first priority, the unloading gate assigned is in the vicinity of a refrigeration storage unit;

wherein the removal of products from the unloading gate according to the first resources schedule is sooner when the products have the first priority compared to when the products have the second priority;

when the unloading gate is assigned and the first resources schedule determined, check the products on the vehicle for cold chain compliance by performing a temperature check on the products, and when the products do not attain cold chain compliance, indicate that the products should be returned;

when the products meet cold chain compliance, determine a second resources schedule for the automated vehicles to inspect the products and to determine a quality control result based at least in part upon the anticipated future conditions of the product and the resources information, wherein the quality control result is a score that is determined based upon an inspection of the products;

subsequent to obtaining the quality control results and based upon quality control results and the priority parameters, determine a product disposition schedule;

wherein the automated vehicles are utilized to implement the first resources schedule, the second resources schedule, and the product disposition schedule.

2. The system of claim 1, wherein the shipping destination is a distribution center or warehouse.

3. The system of claim 1, wherein the control circuit is configured to obtain an access code and to send the access code to a driver of the vehicle.

4. The system of claim 1, wherein the product disposition schedule specifies a third resources schedule to move the products from the destination to a selected area in a retail store.

5. The system of claim 4, wherein the selected area is a freezer, a chiller, a stockroom, or a retail space.

6. The system of claim 1, wherein the traffic conditions include weather conditions and traffic congestion conditions.

7. The system of claim 1, wherein the priority parameters are received from the vehicle, from the shipping source, or from the manufacturer of the product.

8. A method to automatically manage the unloading of vehicles at an unloading dock at a shipment destination, the method comprising:

providing a shipping vehicle;

providing products that are being shipped aboard the shipping vehicle from a shipping source to a shipping destination;

providing an electronic identifier that is coupled to or associated with the products, the electronic identifier configured to provide information sufficient to identify the products;

providing one or more automated vehicles operating at the shipping destination;

sensing traffic conditions along the route of the vehicle from the shipping source to the shipping destination;

sensing the electronic identifier on products that are being shipped on the vehicle from the shipping source to the shipping destination, and determining an estimated time of arrival (ETA) of the vehicle at the shipping destination based upon a current sensed location of the products and traffic conditions associated with the vehicle;

receiving the ETA and priority parameters associated with the products, wherein the priority parameters indicate the demand for the products and whether the products are perishable;

storing resources information concerning workers at the destination, the ETA, and the priority parameters at a database;

determining anticipated future conditions of the product based upon the ETA and the priority parameters at a control circuit, wherein the anticipated future conditions of the products relate to future spoilage or inoperability of the products;

determining a priority of the products;

initially, assigning an unloading gate at the destination and determining a first resources schedule for unloading personnel or automated vehicles to remove the products from the vehicle at the gate by the control circuit based at least in part upon the anticipated future conditions of the product, the priority and the resources information, and when there is no unloading gate available, assigning the vehicle to a waiting area;

wherein the products have a first priority when the products are perishable and in demand, and have a second priority when the products are non-perishable and not in demand, and the first priority is higher than the second priority;

wherein when the products have a first priority, the unloading gate assigned is in the vicinity of a refrigeration storage unit;

wherein the removal of products from the unloading gate according to the first resources schedule is sooner when the products have the first priority compared to when the products have the second priority;

when the unloading gate is assigned and the first resources schedule determined, checking the products on the vehicle for cold chain compliance by performing a temperature check on the products, and when the products do not attain cold chain compliance, indicate that the products should be returned;

when the products meet cold chain compliance, determining by the control circuit a second resources schedule for quality control personnel or automated vehicles to inspect the products and to determine a quality control result based at least in part upon the anticipated future conditions of the product and the resources information wherein the quality control result is a score that is determined based upon an inspection of the products;

subsequent to obtaining the quality control results and based upon quality control results and the priority parameters, determining a product disposition schedule by the control circuit;

implementing the first resources schedule, the second resources schedule, and the product disposition schedule using the automated vehicles.

9. The method of claim 8, wherein the shipping destination is a distribution center or warehouse.

10. The method of claim 8, wherein the control circuit is configured to obtain an access code and to send the access code to a driver of the vehicle.

11. The method of claim 8, wherein the product disposition schedule specifies a third resources schedule to move the products from the destination to a selected area in a retail store.

12. The method of claim 11, wherein the selected area is a freezer, a chiller, a stockroom, or a retail space.

13. The method of claim 8, wherein the traffic conditions include weather conditions and traffic congestion conditions.

14. The method of claim 8, wherein the priority parameters are received from the vehicle, from the shipping source, or from the manufacturer of the product.

* * * * *

UNITED STATES PATENT AND TRADEMARK OFFICE
CERTIFICATE OF CORRECTION

PATENT NO. : 10,628,786 B2  
APPLICATION NO. : 16/186949  
DATED : April 21, 2020  
INVENTOR(S) : Andrew B. Millhouse and Jeffrey Alan Ward

Page 1 of 1

It is certified that error appears in the above-identified patent and that said Letters Patent is hereby corrected as shown below:

In the Claims

Claim 1, Column 10, Line 57, delete "products", and insert -- products, --, therefor.

Signed and Sealed this
Eighteenth Day of August, 2020

Andrei Iancu
*Director of the United States Patent and Trademark Office*